D. P. FOSTER.
Adjustable Ladder-Hook.
No. 215,729. Patented May 27, 1879.
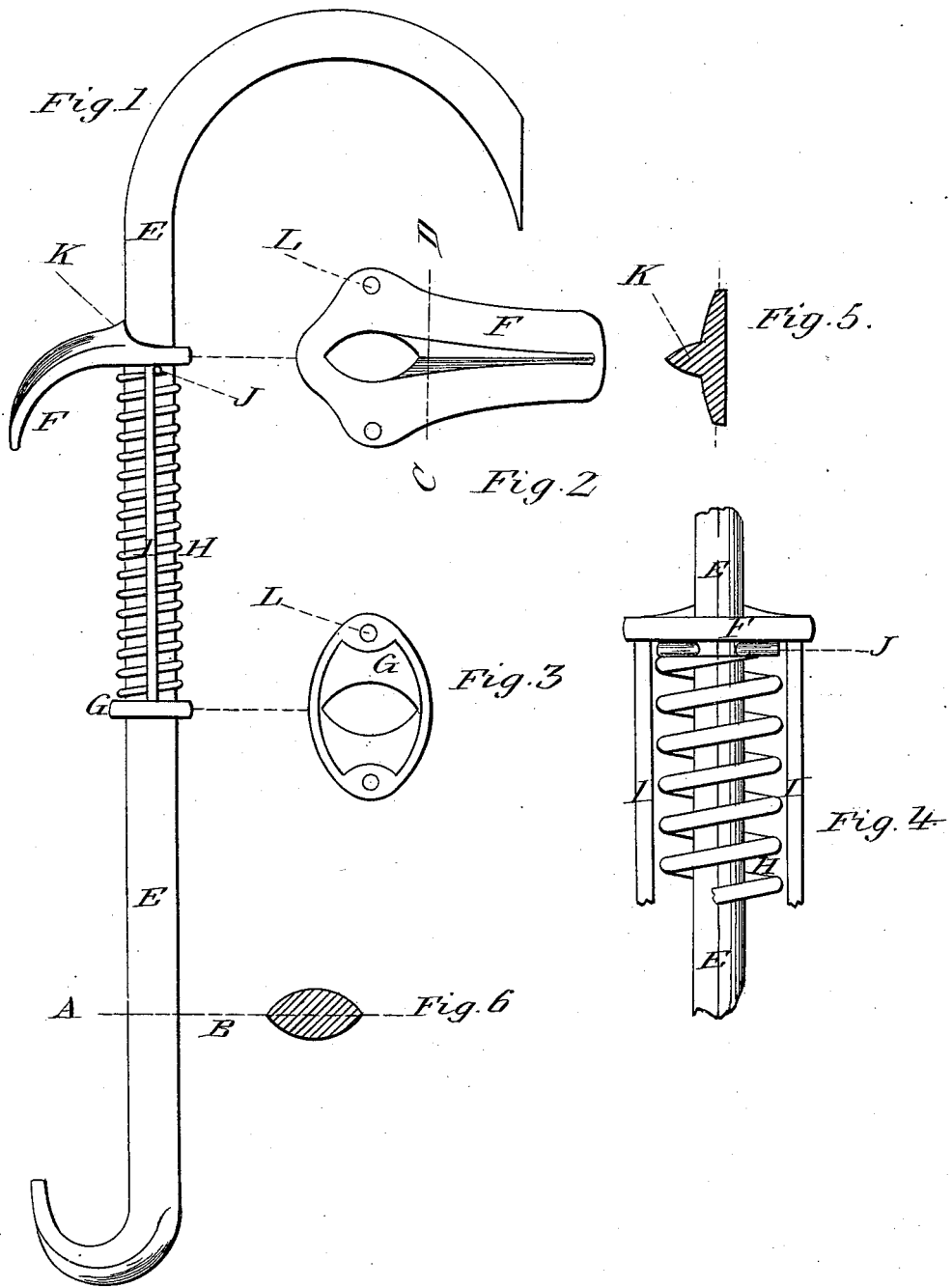
WITNESSES
Joseph Hoskin
Louis P. Foster
INVENTOR.
Dan P. Foster

UNITED STATES PATENT OFFICE.

DAN P. FOSTER, OF WALTHAM, MASSACHUSETTS.

IMPROVEMENT IN ADJUSTABLE LADDER-HOOKS.

Specification forming part of Letters Patent No. 215,729, dated May 27, 1879; application filed October 4, 1878.

*To all whom it may concern:*

Be it known that I, DAN P. FOSTER, of Waltham, in the county of Middlesex, State of Massachusetts, have invented new and useful Improvements in Adjustable Ladder-Hooks, of which the following is a full and exact description, reference being made to the accompanying drawings, and to the letters of reference marked thereon.

My invention consists in making a movable hook self-adjusting by means of a helical spring around the shank of the main hook, whereby it readily adjusts itself to the rounds of a ladder and attaches itself thereto.

In the drawings, Figure 1 is an elevation of hook; Fig. 2, an adjustable clamp-hook; Fig. 3, cross-head; Fig. 4, enlarged view of the adjustable clamp-hook and its several connections; Fig. 5, section through C D, Fig. 2; Fig. 6, section through A B, Fig. 1.

I make my main hook of one piece, as shown in Fig. 1 and in section Fig. 6. My adjustable clamp-hook F is made of malleable iron, with a hole near one end the size and form of the shank of the main hook E, as seen in Fig. 2. The other end has a slight curve, sufficient to clamp a round of the ladder.

The projection K, Figs. 1 and 5, is a ribbed brace, for support to hook F. L L, Figs. 2 and 3, are holes for receiving the guide-rods I I, Figs. 1 and 4.

Fig. 3 is the oval cross-head, with holes for receiving the guide-rods I I, and a hole in the center, of the size and form of the shank of the main hook E.

H, Fig. 1, is a helical spring within the rods I I and between the adjustable clamp-hook F and the cross-head G, Fig. 1. I I, Fig. 4, are the guide-rods, made fast to cross-head G and adjustable clamp-hook F. J, Fig. 4, is a stop-pin, serving as an abutment to spring H and as a stop to the downward movement of hook F.

What I claim as my invention, and wish to secure by Letters Patent, is—

1. The movable hook F, provided with ribbed back K, substantially as described.

2. The combination, in a ladder-hook, of the spring H with main hook E and adjustable clamp-hook F, substantially as described.

3. The combination of the cross-head G, with guide-rods I I, with the main hook E, adjustable clamp-hook F, spring H, and pin J, as set forth.

4. The self-adjusting ladder-hook, composed of the parts E, F, G, H, I, and J, substantially as described, and for the purpose set forth.

DAN P. FOSTER.

Witnesses:
LOUIS V. FOSTER,
JOSEPH HOSKIN.